Oct. 9, 1962 J. W. TUMAVICUS 3,057,581
ROCKET VECTORING ARRANGEMENT
Filed June 25, 1959 2 Sheets-Sheet 1
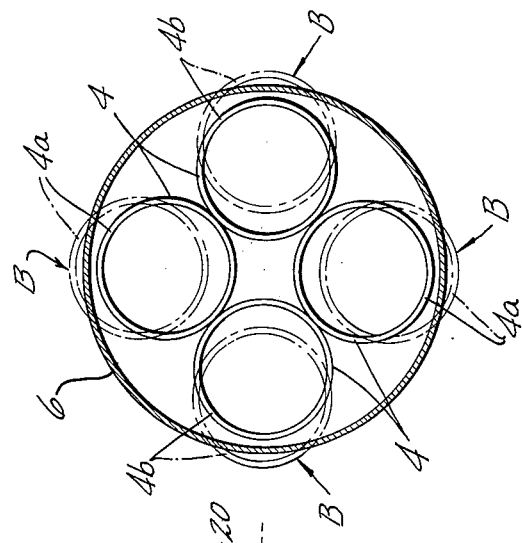
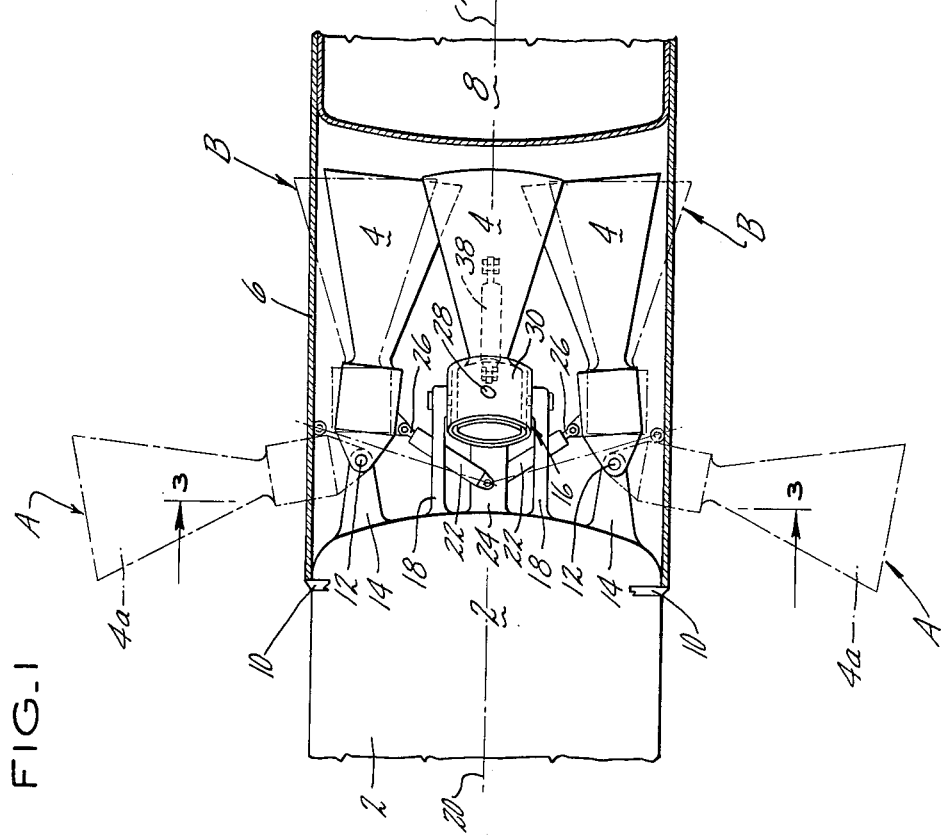
INVENTOR
JULIUS W. TUMAVICUS
BY Charles A. Warren
ATTORNEY Oct. 9, 1962  J. W. TUMAVICUS  3,057,581
ROCKET VECTORING ARRANGEMENT
Filed June 25, 1959  2 Sheets-Sheet 2
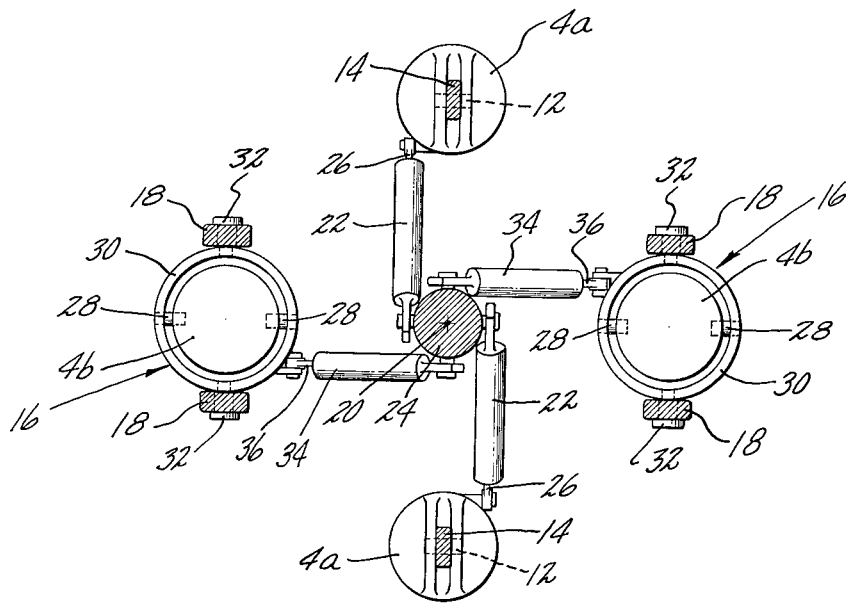
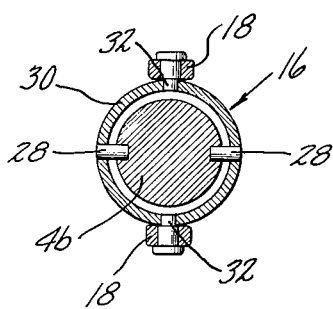
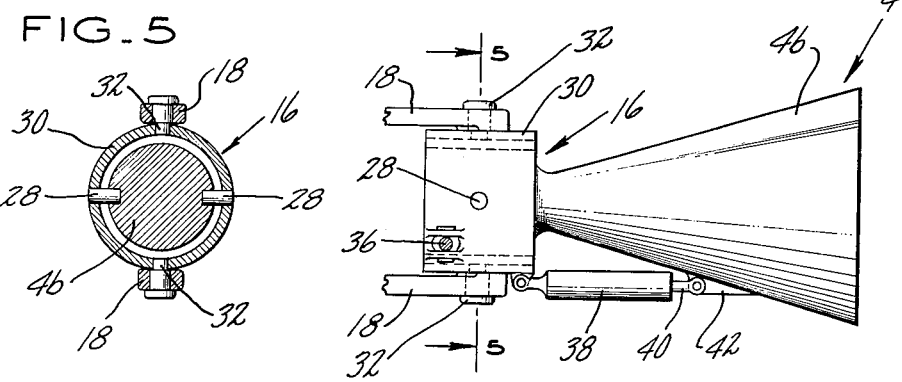
INVENTOR
JULIUS W. TUMAVICUS
BY
ATTORNEY 3,057,581
ROCKET VECTORING ARRANGEMENT
Julius W. Tumavicus, Old Saybrook, Conn., assignor to United Aircraft Corporation, East Hartford, Conn., a corporation of Delaware
Filed June 25, 1959, Ser. No. 822,885
11 Claims. (Cl. 244—52)

This invention relates to rockets and particularly to a mounting of a group of rockets on a vehicle.

In vectoring of a plurality of rockets for directional control each rocket or nozzle is most effective when the line of thrust of the rocket on the vehicle is spaced as far as possible from the vehicle axis. It is also desirable to position each of the several rockets far enough apart so that each rocket may vector independently of the others in controlling the direction of the vehicle. One feature of the present invention is the mounting of the rockets or nozzles at substantial distances of the vehicle axis. Another feature is the mounting of the rocket or nozzles such that when the axes of the several nozzles or rockets are parallel to the vehicle axis the discharge ends of the nozzle are spaced apart radially so that vectoring of some of the nozzles in any direction may occur. Another feature is the mounting of each of the several rockets such that the pivot for each rocket or nozzle is spaced as far from the vehicle axis as possible, at least a distance more than one and one-half times the radius of the discharge end of the rocket.

In a multistage rocket, the several rockets for the second or later stage should be positionable within the outer envelope or maximum diameter of the vehicle during the launching or operation of earlier stages, otherwise the projecting portions of the rockets or nozzles may seriously affect the flight of the vehicle. One feature of the present invention is an arrangement for rocking the discharge ends of all of the rockets radially inward from the normal position in order to place these discharge ends within the vehicle envelope while maintaining the pivotal support at a substantial distance from the axis. Another feature is an arrangement of this type in which, where there are at least two pairs of rockets, one pair is arranged for both pitch and yaw control with the other pair mounted for reverse thrust and for directional control about one transverse axis.

Other features and advantages will be apparent from the specification and claims, and from the accompanying drawing which illustrates an embodiment of the invention.

FIG. 1 is a sectional view through a rocket showing the invention.

FIG. 2 is an end view of the several rockets within the enclosing structure.

FIG. 3 is a diagrammatic sectional view substantially along the line 3—3 of FIG. 1.

FIG. 4 is a diagrammatic side elevation of one of the rockets.

FIG. 5 is a sectional view substantially along the line 5—5 of FIG. 4.

The arrangement is shown in a multistage rocket in which the second or a later stage includes a vehicle 2 having mounted on the underside thereof four rockets 4 for propelling the vehicle. These rockets fit with a connecting substantially annular structure shown as a sleeve 6 carried by the first stage rocket or vehicle 8. After the first stage rocket is burned out this first stage vehicle, together with the sleeve 6, is disposed of and the rockets 4 are ignited for propelling the vehicle 2. This vehicle 2 may have a shoulder 10 thereon to hold the first and second stage vehicles in predetermined relation to each other.

In the arrangement shown, the propulsive power for the second stage is the rockets 4 arranged in diametrically opposed pairs, one pair 4a being mounted on trunnions 12 carried by brackets 14 on the underside of the vehicle 2. The other pair of rockets 4b are mounted on gimbals 16, more clearly shown in FIGS. 4 and 5, the gimbals being supported by projections 18 on the underside of the vehicle 2. Accordingly, the rockets 4b may be vectored in any direction about the normal axis thereof, whereas the rockets 4a are mounted to pivot only about the axis of the trunnions 12.

Referring now to FIG. 3, the trunnions 12 for the rockets 4a are parallel to each other and are both tangent to a circle through the axis of the vehicle, this latter being represented by the point 20, FIG. 3. The rockets 4a may be moved about the axis of the trunnions 12 by any suitable mechanism such as the fluid pressure actuated motors including, for each rocket, a cylinder pivotally mounted on a center post 24 on the underside of the vehicle 2 and having an extending piston rod 26 pivoted on the body of the rocket at a point spaced from the axis of the trunnions 12, as shown. Thus, by the selective admission of fluid to one end or the other of the cylinder 22, each rocket 4a will be turned about the axis of its trunnion 12 to move the discharge end of the nozzle in a radial plane either inwardly into the full line position of FIGS. 1 and 2, or outwardly toward or into the reverse thrust position shown in the dot-dash line A of FIG. 1. The normal position of each rocket 4a is with its longitudinal axis parallel to the vehicle axis, as shown in FIGS. 1 and 2, the vehicle axis being the line 20 and the rocket being shown by the dot-dash line B.

The other rockets 4b are supported by the gimbal 16 for vectoring in any direction. To accomplish this, the rocket head for each rocket 4b has oppositely projecting radial pins 28 engaging with a gimbal ring 30 and the latter is in turn mounted on pins 32 in the brackets 18. In this way, the ring 30 may turn about the axis of the pins 32 thereby moving the rocket 4b toward or away from the vehicle axis in a radial plane and the rocket may turn on the axis of the pins 28 with respect to the ring 30 for moving the rocket in a plane spaced from the vehicle axis and parallel to said vehicle axis.

Each rocket 4b is swung about the axis of pins 32 by means of a fluid pressure mechanism including a cylinder 34 pivotally mounted on the stud 24 and having a projecting piston rod 36 pivotally connected to the ring 30. This movement of the rocket 4b is in a radial plane.

Another fluid pressure device including a cylinder 38 connected at one end to the ring 30 and having a projecting piston rod 40 pivotally connected to a bracket 42 on the side of the rocket 4b swivels the rocket about the axis of the pins 28. This movement is in a plane spaced from the vehicle axis and parallel thereto being at right angles to the radial plane in which the rockets 4b move.

With this arrangement, the selective admission of actuating fluid to one end or the other of the cylinders 34 and/or 38 will move the rockets 4b either in the radial plane by rocking about the axis of pins 32 or in the tangential plane by rocking about the axis of pins 28. Accordingly, these two rockets may be utilized for both pitch control and for yaw control. Obviously, these same rockets may provide roll control if necessary through the appropriate supply of actuating fluid to the cylinders 38 of the opposite rockets 4b.

The rockets 4a will then remain in normal operating position with each rocket axis parallel to the vehicle axis except where reverse thrust is desired. At this time the admission of actuating fluid to the cylinders 22 will move these two rockets into the reverse thrust position shown.

It is essential for best results that the center lines of the rockets be located as far as possible from the axis of the vehicle. To accomplish this, it is preferable to have the center lines of the rockets spaced more than one and one-half times the radius of the discharge area of each nozzle from the vehicle axis. By so doing, it is possible to swing all four nozzles radially inward toward the vehicle axis into the full line position of FIGS. 1 and 2 during the time that the earlier stages of the rocket are in use. The rockets and their associated nozzles are swung outwardly into the normal position (dot-dash line B) in which the rocket axes are parallel to the vehicle axis at such time as these nozzles are to be operative.

By swinging these rockets radially inward, it is possible to locate the thrust axes of the nozzles at a greater distance from the vehicle axis than would othoerwise be possible. Furthermore, the rockets when in the inoperative position may have the discharge ends in contact, whereas, when the rockets are in normal operative position the discharge ends of the nozzles will be radially spaced from one another to make possible radially inward movement of any one of the nozzles for more effective directional control.

Although the arrangement has been described as utilizing the rockets 4a primarily as reverse thrust rockets, it is possible that the control arrangement would be such that the rockets 4a provide pitch control while the rockets 4b provide only yaw control except during periods of reverse thrust. It is believed however, that it would be more effective and would minimize the controls necessary if both pitch and yaw control were obtained through the rockets 4b during the entire operation of the rockets. In this way, during the periods of reverse thrust when pitch and yaw controls might be more critical than during normal operation, the same controls will be operative to accomplish this as are used during the remainder of the flight of the vehicle.

It is to be understood that the invention is not limited to the specific embodiment herein illustrated and described, but may be used in other ways without departure from its spirit as defined by the following claims.

I claim:

1. A rocket construction including a substantially cylindrical vehicle having a longitudinal axis, a plurality of rockets attached in a ring to an end of said vehicle for propelling it substantially in the axial direction, each rocket having a nozzle with a discharge end and having a longitudinal axis normally in substantially parallel relation to the longitudinal axis of the vehicle, said plurality of rockets providing, when operating, the entire propulsive thrust for the vehicle, and cooperating pivotal support means on said vehicle and on each rocket for supporting each rocket on the vehicle for pivotal movement, the pivotal support means for each rocket being spaced radially from the axis of the vehicle a distance greater than the radius of the discharge end of the nozzle and less than the radius of the vehicle so that when the rocket axes are parallel to the vehicle axis the discharge ends of the several nozzles are spaced apart and out of contact, the dimension of the discharge ends of the several rockets being such that, when the several rockets are pivoted inwardly to place the discharge ends in contact, the entire discharge ends will be within a cylindrical diameter smaller than the vehicle.

2. A rocket construction as in claim 1, including means for moving each of said rockets about a pivotal axis tangent to a circle, the center of which coincides with the vehicle axis.

3. A rocket construction as in claim 1, including means for vectoring each nozzle in a radial plane in a manner to move the discharge end of the nozzle toward the vehicle axis from the normal position in which the rocket axis is parallel to the vehicle axis.

4. A rocket construction as in claim 1 in which the pivotal support for each rocket is spaced from the vehicle axis a distance more than one and one-half times the radius of the discharge end of the nozzle for each rocket.

5. A rocket construction as in claim 1 in which the plurality of rockets consist of opposed pairs of rockets with means for swinging the rockets of one pair about their respective pivotal axes substantially in a longitudinal plane passing through the longitudinal axis of the vehicle and means for moving the other pair of rockets in a radial plane and in other longitudinal planes at right angles thereto.

6. A rocket construction, including a substantially cylindrical vehicle having a longitudinal axis, a plurality of rockets carried by the vehicle for propelling it, said rockets being arranged in a cluster at one end around the vehicle axis, each rocket having a nozzle with a discharge end and pivotal support means for supporting each rocket on the vehicle for pivotal movement in a direction radially of the vehicle axis with the pivotal axis for each rocket located at a distance from the vehicle axis more than one and one-half times greater than the radius of the discharge end of the nozzle and less than the radius of the vehicle.

7. A rocket as in claim 6, including means for moving each of said rockets in said radial direction to move the discharge ends of the nozzle toward the axis of the vehicle.

8. In a multistage rocket, a first stage vehicle, including a substantially annular connecting structure, a later stage vehicle engaging with said connecting structure and having a downstream end, a plurality of rockets arranged in a ring and pivotally mounted on said downstream end for propelling the later stage vehicle, each rocket having a longitudinal axis and a discharge end, said rockets and the downstream end of said later stage vehicle being received within the enclosing annular structure on the first stage vehicle, and means for moving each of the plurality of rockets about its pivotal mounting in a plane including the vehicle axis such that the discharge ends will be moved inwardly from normal position to be received within said annular connecting structure.

9. A rocket construction as in claim 8 in which the pivotal mounting for the rockets is such that when the rocket axes are parallel to the later stage vehicle axis the discharge ends will extend beyond the dimension of the cylinder.

10. A rocket construction including a substantially cylindrical vehicle having a longitudinal axis and a rearward end, a plurality of rockets mounted on said rearward end, each rocket having a nozzle with a discharge end and a longitudinal axis, a plurality of pivotal supports, one for each rocket, on the rearward end of the vehicle, each pivotal support providing for movement of the attached rocket about an axis tangential to an imaginary circle smaller in diameter than the vehicle such that the discharge end of each nozzle moves radially toward or away from the vehicle axis, the diameter of said circle being such that the rockets when their longitudinal axes are parallel to the vehicle axis will have their discharge ends in radially spaced relation to one another and with a portion of each discharge end projecting beyond the periphery of the cylinder.

11. A construction as in claim 10 in which the cylindrical vehicle is mounted on a cylindrical support of substantially the same radius as the vehicle, with the rockets enclosed within said cylinder prior to firing of the rockets.

References Cited in the file of this patent

UNITED STATES PATENTS

| | | |
|---|---|---|
| 2,422,744 | O'Neil | June 24, 1947 |
| 2,938,459 | McGraw et al. | May 31, 1960 |

FOREIGN PATENTS

| | | |
|---|---|---|
| 1,040,930 | France | May 27, 1953 |

OTHER REFERENCES

Aviation Week, March 10, 1958, volume 68, No. 10, pages 22–23.

Space/Aeronautics, October 1958, pages 30–31.

Missiles and Rockets, February 1957, pages 45–46.